United States Patent
Koide et al.

(10) Patent No.: US 8,259,543 B2
(45) Date of Patent: Sep. 4, 2012

(54) DATA RECORDING/REPRODUCTION METHOD AND DATA RECORDING/REPRODUCTION APPARATUS

(75) Inventors: Daiichi Koide, Tokyo (JP); Nobuaki Onagi, Kanagawa (JP); Yasutomo Aman, Kanagawa (JP); Yoshimichi Takano, Tokyo (JP); Haruki Tokumaru, Tokyo (JP)

(73) Assignees: Ricoh Company, Ltd., Tokyo (JP); Nippon Hoso Kyokai, Tokyo (JP)

( * ) Notice: Subject to any disclaimer, the term of this patent is extended or adjusted under 35 U.S.C. 154(b) by 887 days.

(21) Appl. No.: 12/153,512

(22) Filed: May 20, 2008

(65) Prior Publication Data
US 2009/0010123 A1    Jan. 8, 2009

(30) Foreign Application Priority Data

May 21, 2007 (JP) ................. 2007-133991
Mar. 31, 2008 (JP) ................. 2008-090585

(51) Int. Cl.
*G11B 7/00* (2006.01)
(52) U.S. Cl. ............. 369/44.32; 369/53.19; 369/53.14
(58) Field of Classification Search ........... 369/44.32, 369/53.14, 53.18, 53.19
See application file for complete search history.

(56) References Cited

U.S. PATENT DOCUMENTS

| | | | |
|---|---|---|---|
| 4,672,599 A | 6/1987 | Geyer et al. | |
| 6,841,049 B2 | 1/2005 | Ito et al. | |
| 7,164,629 B2 | 1/2007 | Aman et al. | |
| 7,194,750 B2 | 3/2007 | Aman et al. | |
| 7,233,554 B2 | 6/2007 | Onagi et al. | |
| 7,273,534 B2 | 9/2007 | Ito et al. | |
| 2002/0186636 A1* | 12/2002 | Onagi et al. | 369/53.18 |
| 2003/0174599 A1 | 9/2003 | Aman et al. | |
| 2004/0228260 A1 | 11/2004 | Murata et al. | |
| 2006/0051076 A1 | 3/2006 | Aman et al. | |
| 2007/0058500 A1 | 3/2007 | Onagi et al. | |
| 2007/0058510 A1 | 3/2007 | Aman et al. | |
| 2007/0061828 A1 | 3/2007 | Aman et al. | |
| 2007/0107004 A1 | 5/2007 | Aman et al. | |
| 2007/0248000 A1 | 10/2007 | Murata et al. | |
| 2007/0286045 A1 | 12/2007 | Onagi et al. | |
| 2008/0092152 A1 | 4/2008 | Onagi | |

FOREIGN PATENT DOCUMENTS

| | | |
|---|---|---|
| EP | 0 458 477 A2 | 11/1991 |
| JP | 2002-358759 | 12/2002 |
| JP | 2006-107698 | 4/2006 |

* cited by examiner

*Primary Examiner* — Adam R Giesy
(74) *Attorney, Agent, or Firm* — Dickstein Shapiro LLP

(57) ABSTRACT

A data recording/reproduction method for performing a data recording/reproduction process on a flexible optical disk by rotating the flexible optical disk while controlling an axial runout of the flexible optical disk with a stabilizing member that applies an aerodynamic force to the flexible optical disk, and irradiating an optical beam and focusing the optical beam to the flexible optical disk is disclosed that includes the steps of a) generating a first axial runout, b) generating a focus error signal forming an S-curve when the first axial runout is generated, c) determining a position of the optical beam according to the focus error signal, d) generating a second axial runout that is smaller than the first axial runout after step c), and e) conducting at least one of the data recording process and the data reproduction process after step d).

6 Claims, 9 Drawing Sheets

DATA RECORDING/REPRODUCTION METHOD AND DATA RECORDING/REPRODUCTION APPARATUS

BACKGROUND OF THE INVENTION

1. Field of the Invention

The present invention relates to a data recording/reproduction method and a data recording/reproduction method for performing at least one of a recording process and a reproducing process on an optical disk, and more particularly to a data recording/reproduction method and a data recording/reproduction method conducting focus control during a data recording/reproduction operation.

2. Description of the Related Art

Common optical disks (e.g., CD, DVD, Blu-ray disc, HD-DVD) that are widely used for reproducing data and/or writing data are configured with a polycarbonate resin substrate having a diameter of 120 mm and a thickness of 1.2 mm. In a case where a common optical disk is rotated by a common disk drive apparatus, the optical disk exhibits an axial runout (surface vibration) reaching an amount ranging from 50 $\mu m_{P-P}$ to 300 $\mu m_{P-P}$ in the vicinity of its outermost periphery.

Along with the disk drive apparatus, an optical disk recording/reproducing apparatus is also provided with an optical pickup for recording data into an optical disk and/or reproducing data recorded in the optical disk. The optical pickup is configured to detect reproduction signals and control signals by irradiating and condensing an optical beam to a beam spot on the optical disk while conducting focus control and receiving an optical beam reflected to its optical element from the optical disk.

At the beginning of the focus control, a pull-in process of the focus servo is performed. The pull-in process is performed by determining the S-curve formed by a focus error signal. For example, the flowchart of FIG. 7 shows operations performed with the pull-in process.

As shown in FIG. 7, an optical disk is loaded into a disk drive apparatus (Step S1). Then, the loaded optical disk is rotated (Step S2). Then, an optical pickup irradiates an optical beam onto the optical disk and moves an objective lens toward the optical disk for focusing the irradiated beam on a recording surface of the optical disk. At this stage, since axial runout in the above-described amount occurs in the optical disk, the detected focus error signal generates a waveform shaped as an S-letter curve (see (a) of FIG. 8) having the focal point as its center (Step S3). Then, the S-letter curve is monitored for detecting a zero-crossing point. Upon detecting the zero-crossing point, the position of the optical beam is determined, that is, pull-in for a subsequent focus control operation is conducted (Step S4).

Then, a focus control operation is conducted (Step S5). Then, a tracking control operation is conducted (Step S6). After a stable position is maintained for the optical beam by the tracking control operation, a process of recording/reproducing data is conducted (Step S7).

As an example of the optical disk recording/reproducing apparatus, an optical disk recording/reproducing apparatus using a flexible optical disk is disclosed in Japanese Laid-Open Patent Application No. 2006-107698. This optical disk recording/reproducing apparatus is configured to reduce axial runout by using a stabilizing member for applying aerodynamic force to the flexible optical disk. In a case where a thin optical disk having a thickness ranging from 0.08 mm to 0.2 mm is used in this optical disk recording/reproducing apparatus, although the amount of axial runout increases from the innermost periphery to the outermost periphery of the optical disk, the maximum amount of axial runout exhibited by the optical disk ranges from 1 $\mu m_{P-P}$ to 10 $\mu m_{P-P}$. The amount of axial runout exhibited by the optical disk is approximately $\frac{1}{10}$ to $\frac{1}{300}$ compared to that of the common existing optical disk. Thus, axial runout is significantly reduced with the optical disk recording/reproducing apparatus.

As one example of a focus control method performed on the flexible optical disk, Japanese Laid-Open Patent Application No. 2002-358759 discloses a method in which focus control is performed after obtaining a predetermined height by adjusting the amount of a stabilizing member projecting with respect to an optical disk and detecting an S-curve of a focus error signal.

With the configuration disclosed in Japanese Laid-Open Patent Application No. 2006-107698, a constantly occurring disturbance can be reduced during a focus control operation after a pull-in process. Particularly, the focus error amount during high speed rotation of an optical disk can be reduced, to thereby enable a suitable focus control operation during the high speed rotation.

However, in the focus control operation, the small axial runout having a maximum amount ranging from 1 $\mu m_{P-P}$ to 10 $\mu m_{P-P}$ makes it difficult for the focus error signal to form a clear distinctive S-curve. As shown in (b) of FIG. 8, this configuration forms an inconsistent extremely low level S-curve. This causes difficulty in performing the pull-in process.

With the method disclosed in Japanese Laid-Open Patent Application No. 2002-358759, since the amount of projection of the stabilizing member with respect to the optical disk is adjusted prior to the focus control operation, the stabilizing member may contact the optical disk depending on the amount of the projection. Furthermore, an S-curve may not be consistently formed by using this method.

SUMMARY OF THE INVENTION

The present invention may provide a data recording/reproduction method and a data recording/reproduction method that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a data recording/reproduction method and a data recording/reproduction method particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a data recording/reproduction method for performing a data recording/reproduction process on a flexible optical disk by rotating the flexible optical disk while controlling an axial runout of the flexible optical disk with a stabilizing member that applies an aerodynamic force to the flexible optical disk, and irradiating an optical beam and focusing the optical beam to the flexible optical disk, the method including the steps of: a) generating a first axial runout; b) generating a focus error signal forming an S-curve when the first axial runout is generated; c) determining a position of the optical beam according to the focus error signal; d) generating a second axial runout that is smaller than the first axial runout after step c); and e) conducting at least one of the data recording process and the data reproduction process after step d).

Furthermore, another embodiment of the present invention provides a data recording/reproduction apparatus for performing a data recording/reproduction process on a flexible optical disk by rotating the flexible optical disk while controlling an axial runout of the flexible optical disk with a stabilizing member that applies an aerodynamic force to the flexible optical disk, and irradiating an optical beam and focusing the optical beam to the flexible optical disk, the apparatus including: a first operation control mode determining part configured to generate a first axial runout; an optical pickup configured to generate a focus error signal forming an S-curve when the first axial runout is generated; a pull-in part configured to determine a position of the optical beam according to the focus error signal; a second operation control mode determining part configured to generate a second axial runout that is smaller than the first axial runout; and a recording/reproducing part configured to conduct at least one of the data recording process and the data reproduction process.

Other objects, features and advantages of the present invention will become more apparent from the following detailed description when read in conjunction with the accompanying drawings.

DETAILED DESCRIPTION OF THE PREFERRED EMBODIMENTS

[First Embodiment]

Figure 1:
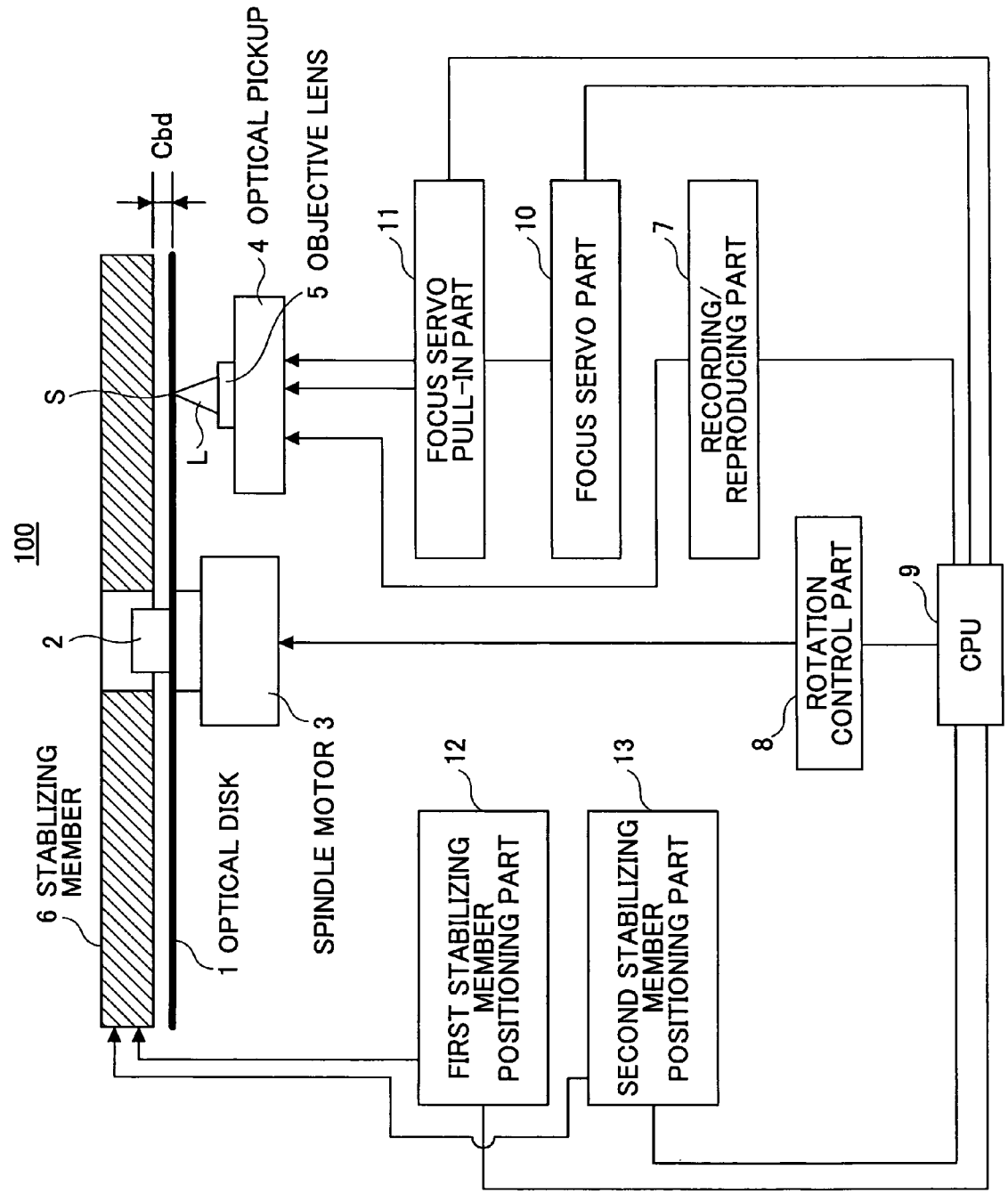
FIG. 1 is a schematic diagram of a recording/reproducing apparatus according to a first embodiment of the present invention.

FIG. 1 is a schematic diagram of a recording/reproducing apparatus 100 according to a first embodiment of the present invention. In FIG. 1, reference numeral 1 indicates an optical disk which is flexible; reference numeral 2 indicates a hub for holding the center of rotation of the optical disk 1; reference numeral 3 indicates a spindle motor for driving the rotation of the optical disk 1; reference numeral 4 indicates an optical pickup for optically scanning the optical disk 1 by irradiating an optical beam L onto a recording surface of the optical disk 1 and focusing the optical beam L to form a beam spot S on the recording surface of the optical disk 1; reference numeral 5 indicates an objective lens 5 included in the optical pickup 4 for focusing the irradiated beam L onto the recording surface of the optical disk 1; and reference numeral 6 indicates a stabilizing member positioned opposite to the recording surface of the optical disk 1 for reducing axial runout of the optical disk 1 by applying an aerodynamic force to the optical disk 1 during rotation (e.g., high speed rotation) of the optical disk 1. The stabilizing member 6 may have a planar shape or a curved shape.

In a case where the stabilizing member 6 has a curved shape, the stabilizing member 6 may be curved at its sides relative to the tangential line of an accessing (feeding) direction of the optical pickup 4 with respect to the optical disk 1 (see, for example, Japanese Laid-Open Patent Application Nos. 2007-80336 and 2007-149311). Furthermore, the center line of the curve of the stabilizing member 6 does not need to match the tangential line of the accessing direction of the optical pickup 4. For example, the optical disk 1 may be slightly tilted (e.g., 10 degrees) for reducing axial runout of the optical disk 1.

Returning to FIG. 1, reference numeral 7 indicates a recording/reproducing part for performing at least a process of recording data in the optical disk 1 (recording process) or a process of reproducing data recorded in the optical disk 1 (reproduction process). The recording/reproducing part 7 may output recording signals indicating data to be recorded in the optical disk 1 to the optical pickup 4 or output reproduction signals according to changes of reflected light from the optical disk 1 detected by the optical pickup 4. Furthermore, reference numeral 8 indicates a rotation control part for controlling the rotational speed of the spindle motor 3. In this embodiment of the present invention, the rotation control part 8 controls the rotation of the optical disk 1 to be a constant rotational speed of 15,000 rpm during recording/reproduction of data. Furthermore, reference numeral 9 indicates a CPU (Central Processing Unit) for controlling various parts and components included in the recording/reproducing apparatus 100.

Reference numeral 10 indicates a focus servo part 10 for adjusting the focus of the objective lens with respect to the optical disk 1. Reference numeral 11 indicates a focus servo pull-in part for perform a pull-in process of the focus servo by determining an S-curve formed by a focus error signal detected by the optical pickup 4.

Figure 9:
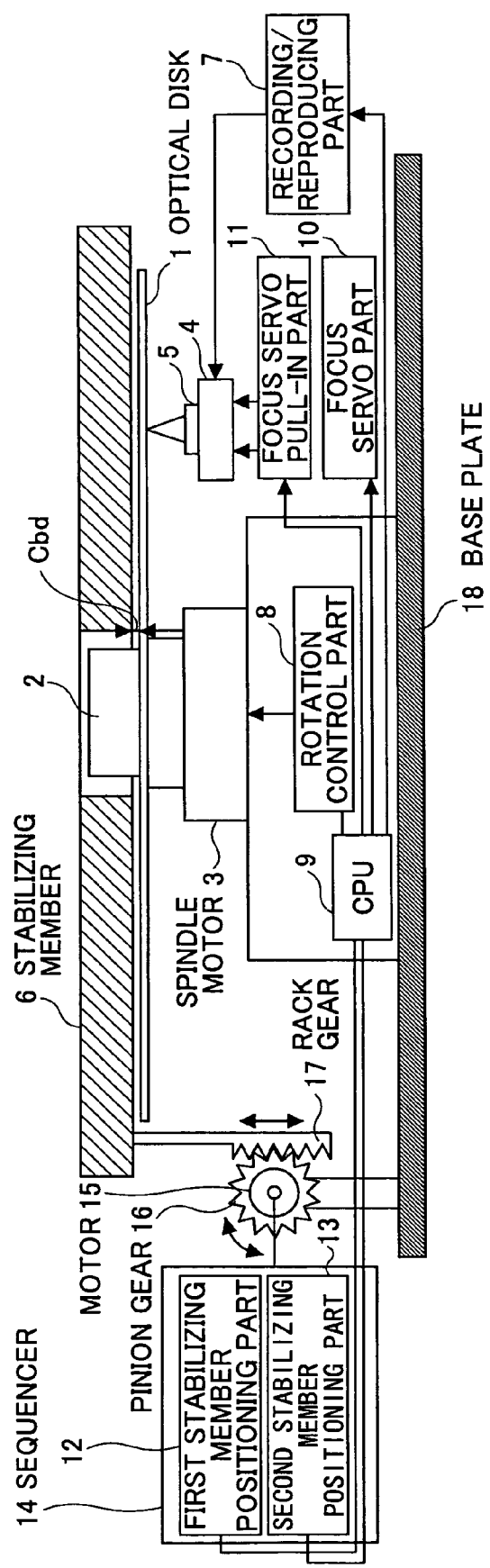
FIG. 9 is a schematic diagram of a recording/reproducing apparatus including first and second stabilizing member positioning parts according to an embodiment of the present invention.

Reference numeral 12 indicates a first stabilizing member positioning part (first operation control mode determining part) for moving the stabilizing member 6 to a position causing a predetermined axial runout (first operation control mode). The predetermined axial runout of the first operation control mode is greater than a permissible axial runout that is obtained when the optical disk 1 is stably rotated having the axial runout reduced (controlled) to substantially a minimum value. As shown in FIG. 9, the first stabilizing member positioning part 12 includes or is connected to a sequencer 14, a motor 15, a pinion gear 16, and a rack gear 17. The sequencer 14 is operated according to instructions from the CPU 9. The motor 15 is controlled to rotate forward and reverse by the sequencer 14. The pinion gear 16 is fixed to a base plate 18 at a predetermined height from the base plate 18. The rack gear 17 meshes with the pinion gear 16 and has one end fixed to the stabilizing member 6. The rotation of the motor 15 is transmitted to the pinion gear 16 and causes the pinion gear 16 to rotate forward or reverse. Then, the rack gear 17 moves upward or downward according to the rotating direction of the pinion gear 16 meshed thereto. The movement (translation) of the rack gear 17 raises or lowers the stabilizing member 6. Thus, the displacement of the stabilizing member 6 is controlled by adjusting the rack gear 17. Accordingly, the stabilizing member 6 can be moved from a position farther from the optical disk 1 to a position at which pull-in of the focus servo (focus servo pull-in position) is conducted. In a case where "Cbd" indicates the distance between the center of the surface of the stabilizing member 6 facing the optical disk 1 and the center of the surface of the optical disk 1 facing the stabilizing member 6, the stabilizing member 6 is moved to a focus servo pull-in position satisfying a relationship of, for example, "0.25 mm≦Cbd≦0.7 mm (Cbd being no less than 0.25 mm but no greater than 0.7 mm)".

Reference numeral 13 indicates a second stabilizing member positioning part 13 (second operation control mode determining part) for moving the stabilizing member 6 to a position in which the axial runout of the optical disk 1 is controlled within the permissible axial runout by applying aerodynamic force to the optical disk 1 (second operation control mode). The second stabilizing member positioning part 13 may have, for example, substantially the same configuration as the first stabilizing member positioning part 12 shown in FIG. 9. That is, the second stabilizing member positioning part 13 includes or is connected to a sequencer 14, a motor 15, a pinion gear 16, and a rack gear 17. Likewise, the sequencer 14 is operated according to instructions from the CPU 9. The motor 15 is controlled to rotate forward and reverse by the sequencer 14. The pinion gear 16 is fixed to a base plate 18 at a predetermined height from the base plate 18. The rack gear 17 meshes with the pinion gear 16 and has one end fixed to the stabilizing member 6. The rotation of the motor 15 is transmitted to the pinion gear 16 and causes the pinion gear 16 to rotate forward or reverse. Then, the rack gear 17 moves upward or downward according to the rotating direction of the pinion gear 16 meshed thereto. The movement (translation) of the rack gear 17 raises or lowers the stabilizing member 6. Thus, the displacement of the stabilizing member 6 is controlled by adjusting the rack gear 17. Accordingly, the stabilizing member 6 can be moved from the focus servo pull-in position to a position where the amount of axial runout of the optical disk 1 becomes minimum (e.g., a position where CBd=0.1 mm).

Figure 2:
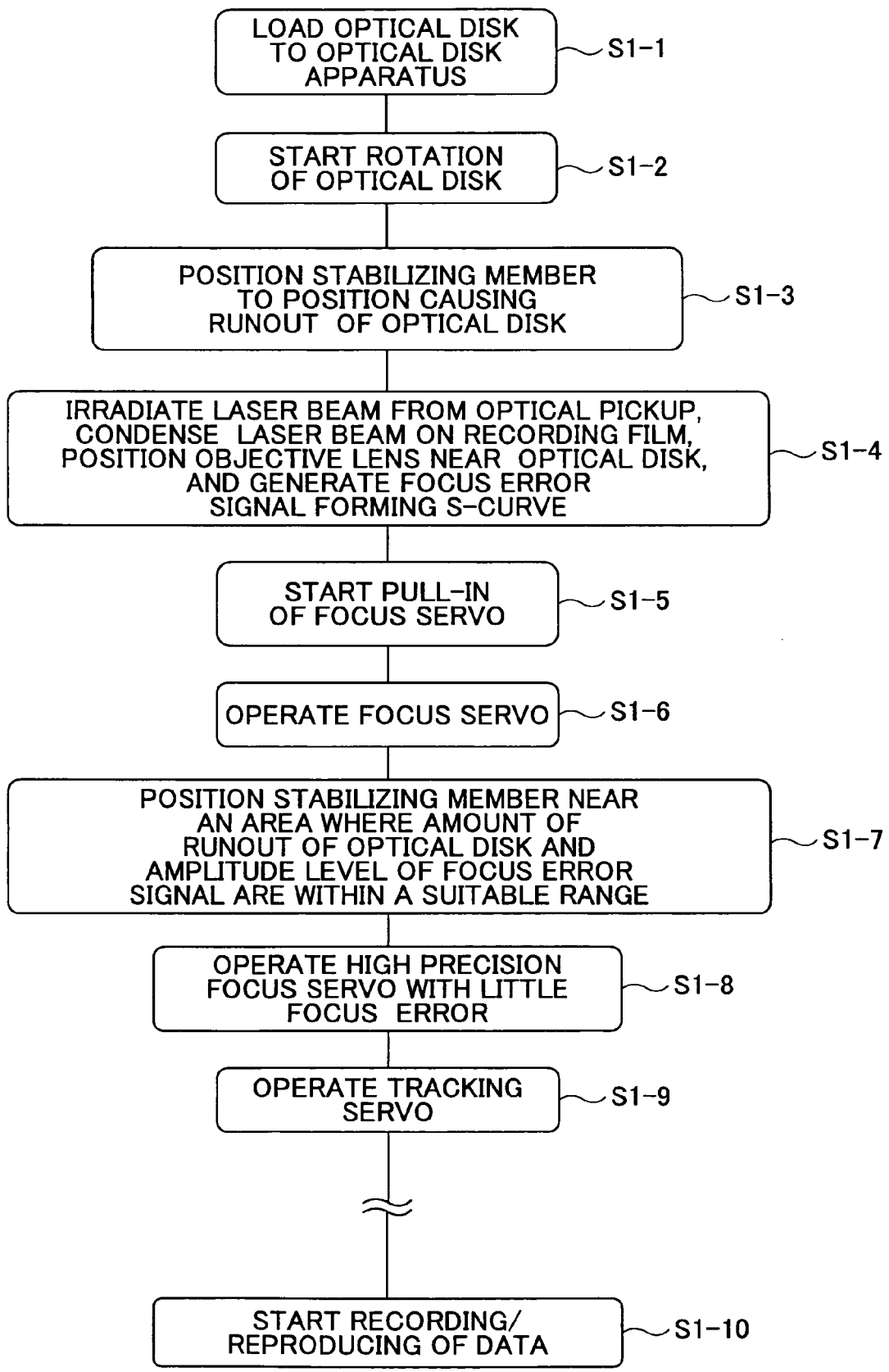
FIG. 2 is a flowchart showing a recording/reproduction operation including a pull-in operation of a focus servo according to a first embodiment of the present invention.

FIG. 2 is a flowchart showing a pull-in operation of a focus servo according to the first embodiment of the present invention.

In FIG. 2, first, the optical disk 1 is loaded onto the hub 2 of the optical disk apparatus 100 (Step S1-1). Then, the rotation control part 8 rotates the optical disk 1 to a predetermined rotational speed (e.g., 2,000 rpm) (Step S1-2). In step S1-2, the stabilizing member is positioned approximately 10 mm away from the optical disk 1 (standby position). The optical disk 1 is provided at a position for preventing other components (including the stabilizing member 6) from contacting the optical disk 1.

Then, the first stabilizing member positioning part 12 moves the stabilizing member 6 toward the optical disk 1 (S1-3). In Step S1-3, the gap "Cbd" between the optical disk 1 and the stabilizing member 6 is set to a predetermined value (e.g., 0.3 mm) so that the amount of axial runout of the optical disk 1 ranges from approximately 10 µm to 100 µm (maximum of 300 µm) (first operation control mode).

Then, focus error detection is performed by irradiating an optical beam (laser beam) L from the optical pickup 4 and moving the objective lens 5 toward the optical disk 1 (Step S1-4). In Step S1-4, a S-curve is clearly formed by the focus error signal since the axial runout caused by the optical disk 1 is large. Based on the S-curve, the focus servo pull-in part 11 initiates pull-in of the focus servo (S1-5). Then, the focus servo part 10 performs a focus servo process on a beam spot S formed on the recording surface of the optical disk 1 (Step S1-6).

Figure 3:
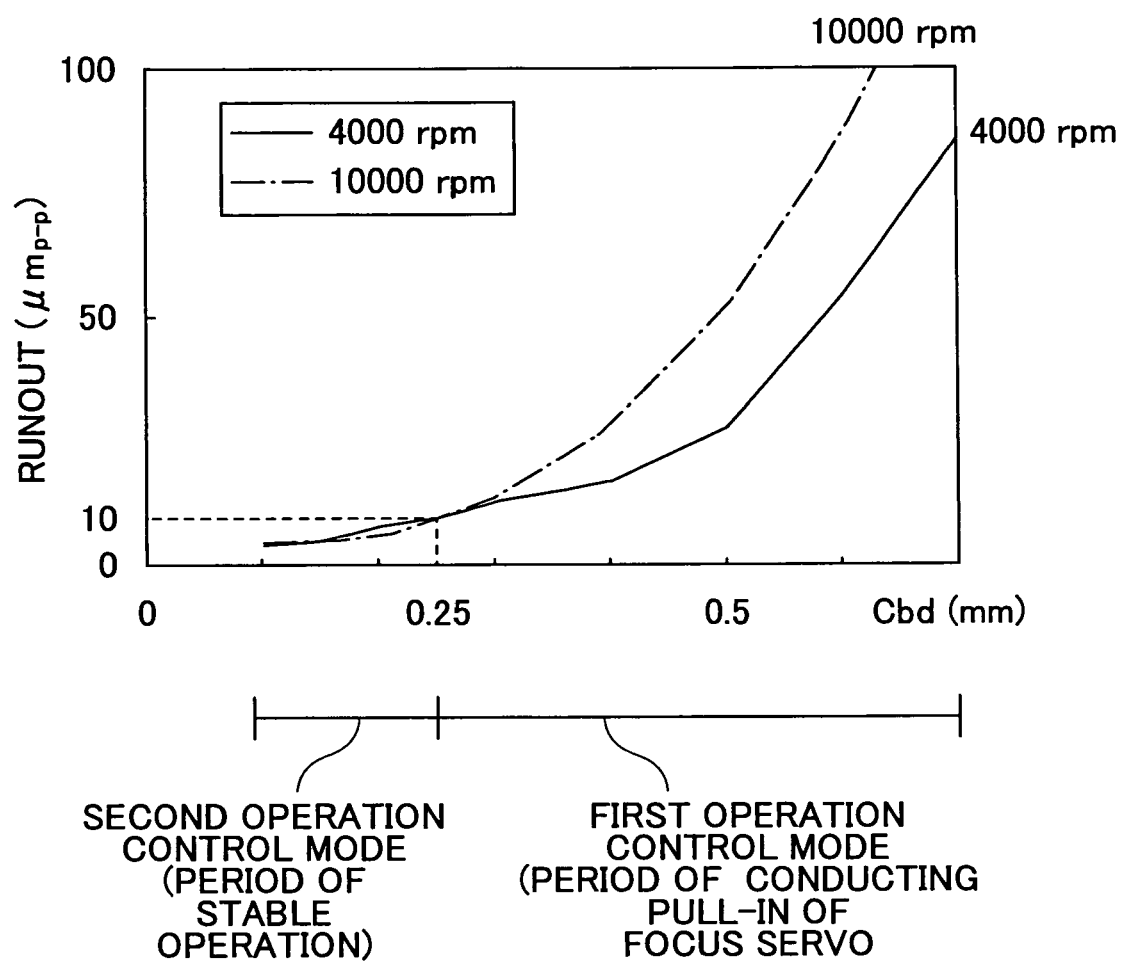
FIG. 3 is a schematic diagram for describing a relationship between axial runout and a gap Cbd in a case where the rotational speed of an optical disk is 4,000 rpm and 10,000 rpm according to an embodiment of the present invention.

In Step S1-6, the axial runout of the optical disk 1 is not yet at a suitable value (not within a permissible range of 0 $\mu m_{P-P}$ to 10 $\mu m_{P-P}$. Therefore, in Step S1-7, the second stabilizing member positioning part 13 moves the stabilizing member 6 toward the optical disk 1 in order to control the amount of axial runout of the optical disk 1 or the runout acceleration of the optical disk to be a suitable value and also to control the amplitude level of the focus error signal to a suitable value (minimum value). In other words, as shown in FIG. 3, the gap "Cbd" between the optical disk 1 and the stabilizing member 6 is set to be a predetermined value (in this example, approximately 0.1 mm) or a predetermined permissible range so that the amount of axial runout of the optical disk 1 becomes a suitable value (in this example, the generated axial runout of the optical disk 1 is 5 µm) (second operation control mode). With the second operation control mode, the high speed rotation of the optical disk 1 and the operations of the stabilizing member 6 realize a highly precise focus servo with little focus error (Step S1-8).

Then, once the beam spot B is focused on the recording surface of the optical disk 1, a tracking operation is conducted (Step S1-9). Then, when the position of the optical beam L is stably maintained along a desired track on the recording surface of the optical disk 1 by the tracking operation, data are recorded to the optical disk 1 or data recorded in the optical disk 1 are reproduced (Step S1-10).

With the optical disk apparatus 100 according to the first embodiment of the present invention, in a case of performing focus control on a thin flexible optical disk 1 by using the stabilizing member 6 for effectively reducing axial runout during high speed rotation of the optical disk 1, the pull-in of the focus servo can be reliably executed. Thereby, high speed recording/reproduction of data can be performed with the optical disk apparatus 100.

(Second Embodiment)

Figure 4:
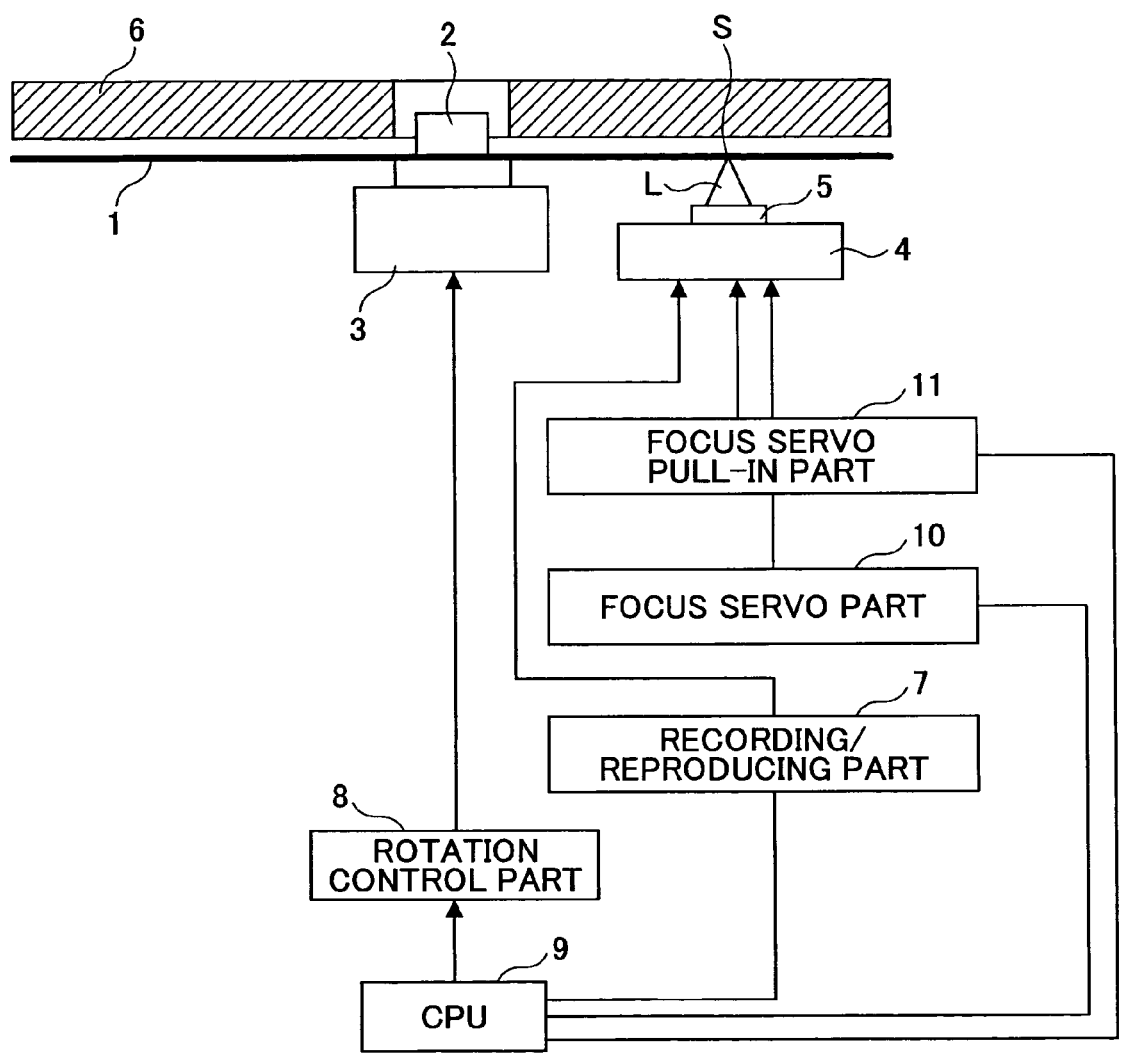
FIG. 4 is a schematic diagram showing a recording/reproducing apparatus according to a second embodiment of the present invention.

FIG. 4 is a schematic diagram showing a recording/reproducing apparatus 200 according to a second embodiment of the present invention. It is to be noted that, in the second embodiment of the present invention, like components of the first embodiment of the present invention are denoted with like reference numerals and are not further explained.

Unlike the first embodiment of the present invention, the recording/reproducing apparatus 200 according to the second embodiment of the present invention has no first and second stabilizing member positioning parts 12, 13. In the recording/reproducing apparatus 200, the gap between the optical disk 1 and the stabilizing member 6 is set (determined) beforehand. In the recording/reproducing apparatus 200, the rotation control part 8 is set with a predetermined value for enabling the spindle motor 2 to rotate the optical disk 1 at a rotational speed that generates an axial runout greater than the above-described permissible axial runout (first operation control mode). Furthermore, the rotation control part 8 is set with another predetermined value for enabling the spindle motor 2 to rotate the optical disk at a rotational speed that generates an axial runout within the above-described permissible range when the focus servo is in focus state (second operation control mode). Thus, the rotation control part 8 according to the second embodiment of the present invention functions as the first and second operation control mode determining parts.

The pull-in operation of the focus servo according to the second embodiment of the present invention is described with reference to FIG. 5.

Figure 5:
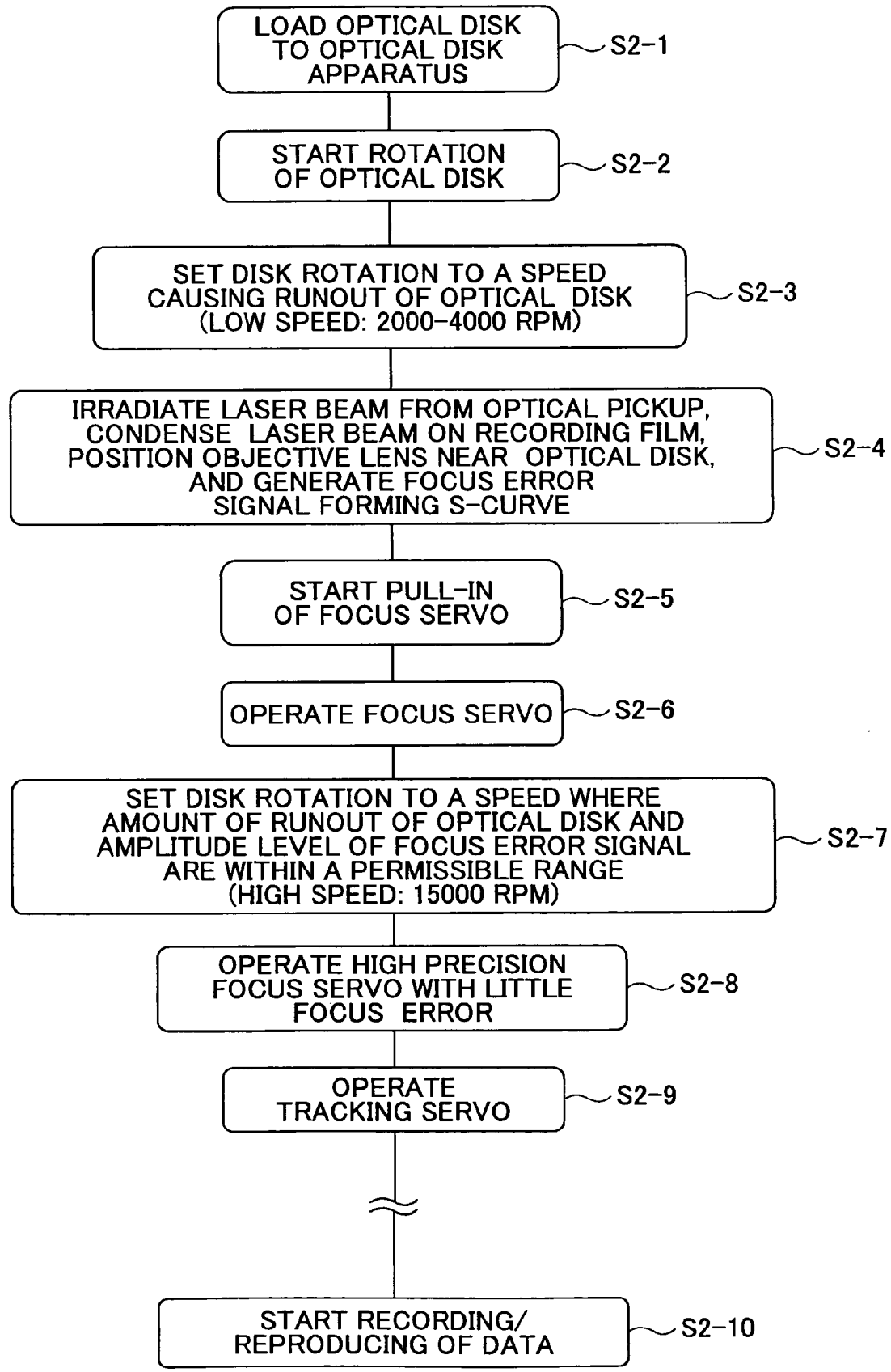
FIG. 5 is a flowchart showing a recording/reproduction operation including a pull-in operation of a focus servo according to a second embodiment of the present invention.

In FIG. 5, first, the optical disk 1 is loaded onto the hub 2 of the optical disk apparatus 200 (Step S2-1). In Step S2-1, the optical disk 1 is loaded at a position forming a gap relative to the stabilizing member 6. The gap is set to be a predetermined value (in this example, 0.25 mm). Then, the rotation control part 8 initiates rotation of the optical disk 1 (Step S2-2). Then, in Step S2-3, the rotation control part 8 sets the rotation of the optical disk 1 at a rotational speed corresponding to the first operation control mode (in this example, a low rotational speed ranging from 2,000 rpm to 4,000 rpm). That is, the optical disk 1 is rotated at a rotational speed that generates an axial runout ranging from approximately 10 µm to 100 µm. Then, focus error detection is performed by irradiating an optical beam (laser beam) L from the optical pickup 4 and moving the objective lens 5 toward the optical disk 1 (Step S2-4). In Step S1-4, an S-curve is clearly formed by the focus error signal since the axial runout generated by the optical disk 1 is large. By referring to the S-curve formed by the focus error signal, the focus servo pull-in part 11 initiates pull-in of the focus servo (S2-5). Then, the focus servo part 10 performs a focus servo operation with respect to a beam spot S of the optical beam L formed on the surface of the optical disk 1 (Step S2-6).

In Step S2-6, the axial runout of the optical disk 1 is not yet at a suitable value (not within a permissible range of 0 $\mu m_{P-P}$ to 10 $\mu m_{P-P}$. Therefore, in Step S2-7, the rotation control part 8 sets the rotation of the optical disk 1 at a rotational speed corresponding to the second operation control mode (in this example, a high rotational speed of 15,000 rpm). That is, the optical disk 1 is rotated at a rotational speed in order to control the amount of axial runout of the optical disk 1 or the runout acceleration of the optical disk to be a suitable value and also to control the amplitude level of the focus error signal to be a suitable value (minimum value). With the second operation control mode, the high speed rotation of the optical disk 1 and the aerodynamic effect applied by the stabilizing member 6 realize a highly precise focus servo operation with little focus error (Step S2-8).

Then, once the beam spot B is focused on the recording surface of the optical disk 1, a tracking operation is conducted (Step S2-9). Then, when the position of the optical beam L is stably maintained along a desired track on the surface of the optical disk 1 by the tracking operation, data are recorded to the optical disk 1 or data recorded in the optical disk 1 are reproduced (Step S2-10).

With the optical disk apparatus 200 according to the second embodiment of the present invention, in a case of performing focus control on a thin flexible optical disk 1 by using the stabilizing member 6 for effectively reducing axial runout during high speed rotation of the optical disk 1, the pull-in of the focus servo can be reliably executed. Thereby, high speed recording/reproduction of data can be performed with the optical disk apparatus 200.

(Third Embodiment)

Figure 6:
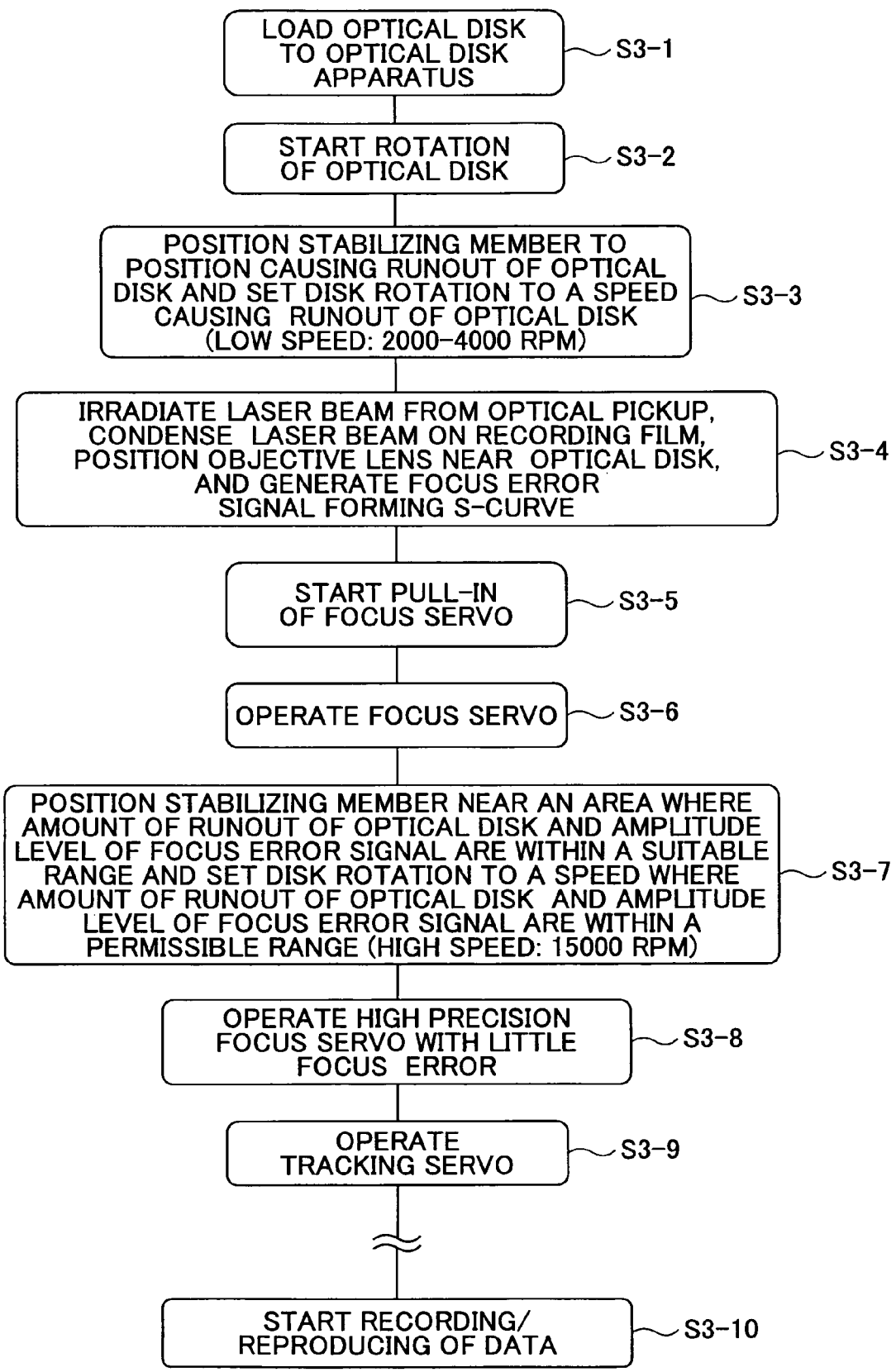
FIG. 6 is a flowchart showing a recording/reproduction operation including a pull-in operation of a focus servo according to a third embodiment of the present invention.
Figure 7:
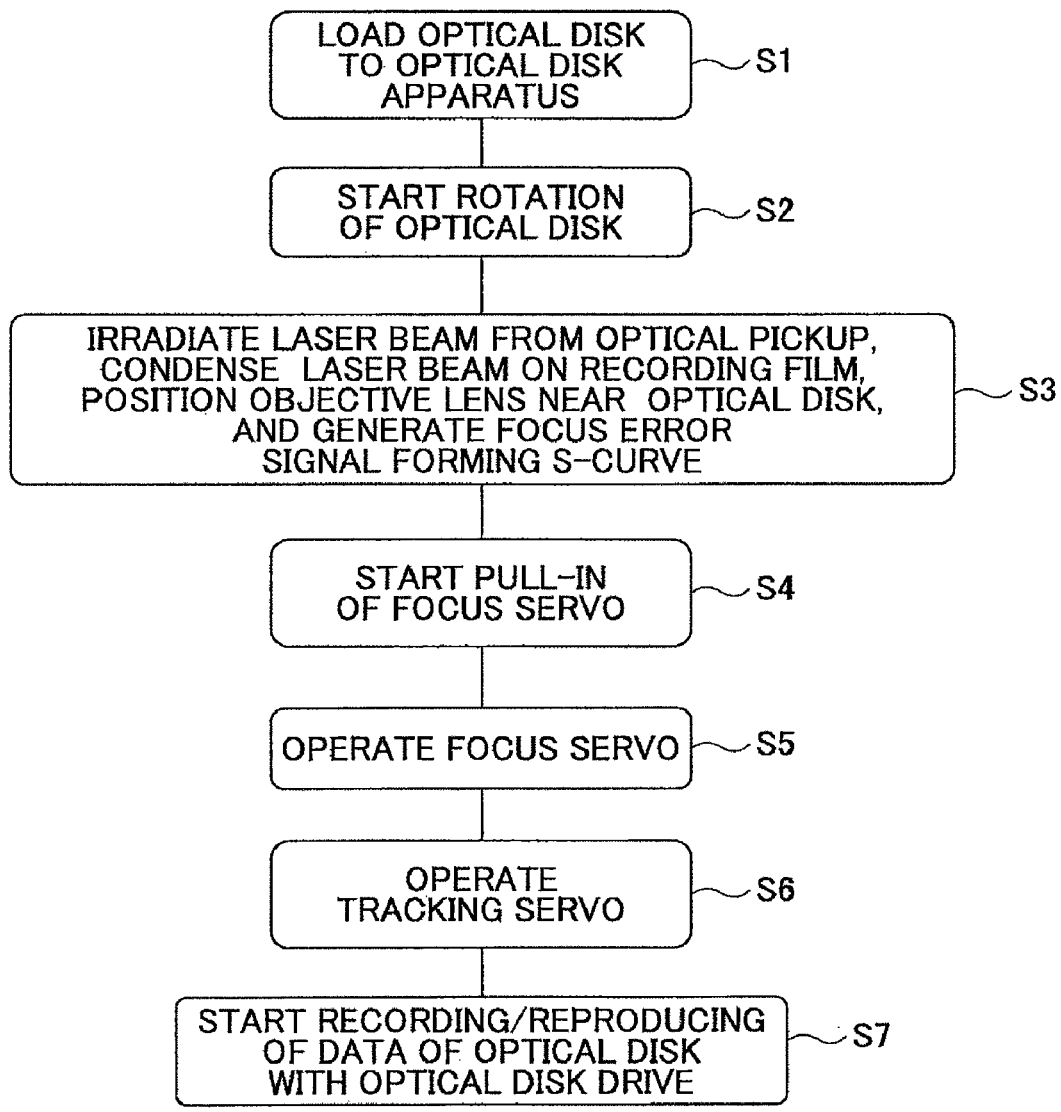
FIG. 7 is a flowchart showing a recording/reproduction operation including a pull-in operation of a focus servo according to a related art example.
Figure 8:
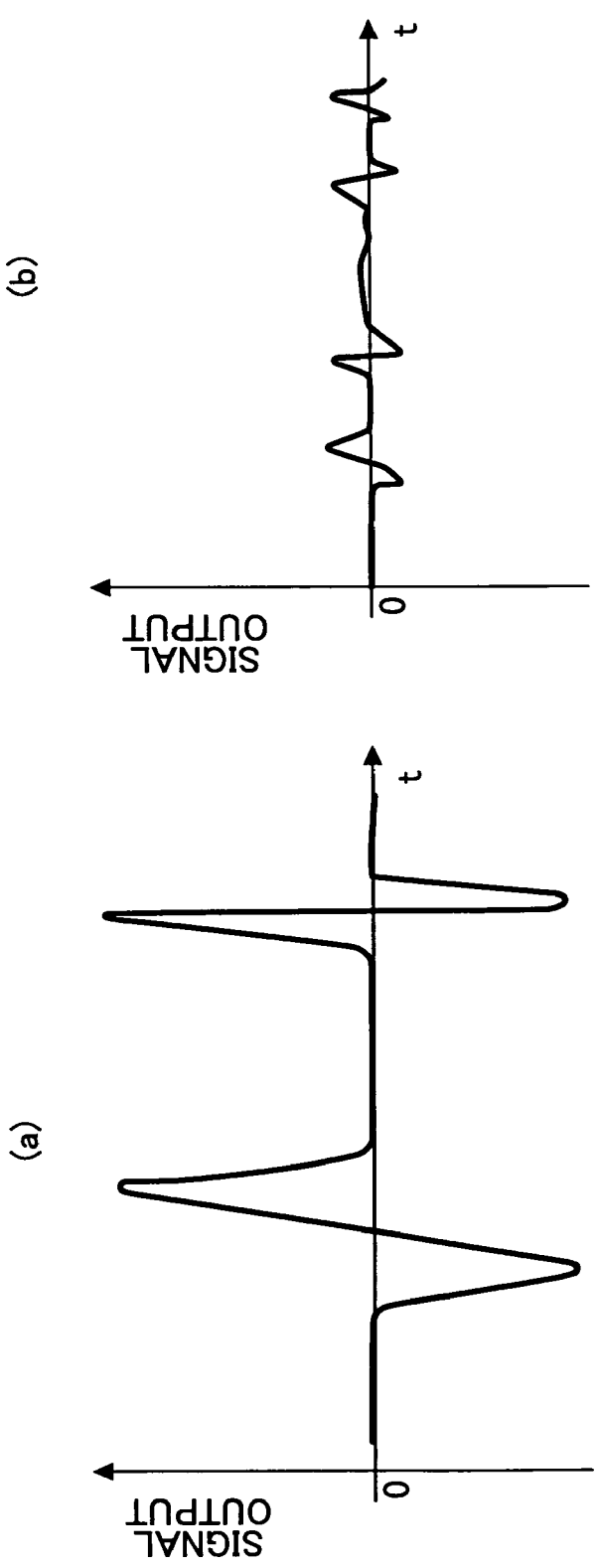
FIG. 8 shows graphs (a) and (b) for describing an S-curve of a focus error signal.

FIG. 6 is a flowchart showing a pull-in operation of the focus servo according to the third embodiment of the present invention. The pull-in operation performed by a recording/reproducing apparatus according to the third embodiment of the present invention basically has the same configuration as the recording/reproducing apparatus 100 shown in FIG. 1.

In FIG. 6, first, the optical disk 1 is loaded onto the hub 2 of the optical disk apparatus 100 (Step S3-1). Then, the rotation control part 8 rotates the optical disk 1 to attain a predetermined rotational speed (Step S3-2). In step S3-2, the stabilizing member 6 is positioned approximately 10 mm away from the optical disk 1 (standby position). The optical disk 1 is provided at a position for preventing other components (including the stabilizing member 6) from contacting the optical disk 1.

Then, in a first operation control mode, the first stabilizing member positioning part 12 moves the stabilizing member 6 toward the optical disk 1 and the rotation control part 8 sets the rotation of the optical disk 1 at a rotational speed corresponding to the first operation control mode (a low rotational speed less than the below-described rotational speed corresponding to the second operation control mode) (Step S3-3). The gap Cbd between the stabilizing member 6 and the optical disk 1 and the rotational speed corresponding to the first operation control mode are calculated beforehand for generating an axial runout ranging from approximately 10 µm to 100 µm.

Then, focus error detection is performed by irradiating an optical beam (laser beam) L from the optical pickup 4 and moving the objective lens 5 toward the optical disk 1 (Step S3-4). In Step S3-4, a S-curve is clearly formed by the focus error signal since the axial runout generated by the optical disk 1 is large. By referring to the S-curve formed by the focus error signal, the focus servo pull-in part 11 initiates pull-in of the focus servo (S3-5). Then, the focus servo part 10 performs a focus servo operation with respect to a beam spot S of the optical beam L formed on the surface of the optical disk 1 (Step S3-6).

In Step S3-6, the axial runout of the optical disk 1 is not yet at a suitable value (not within a permissible range of 0 $\mu m_{P-P}$ to 10 $\mu m_{P-P}$. Therefore, in Step S3-7, the second stabilizing member positioning part 13 moves the stabilizing member 6 toward the optical disk 1 (in this example, cbd is set to approximately 0.1 mm) along with having the rotation control part 8 set the rotation of the optical disk 1 at a rotational speed corresponding to the second operation control mode (in this example, a high rotational speed of 15,000 rpm). This enables the amount of axial runout of the optical disk 1 or the runout acceleration of the optical disk to be controlled to be a suitable value and also enables the amplitude level of the focus error signal to be controlled to be a suitable value (minimum value). With the second operation control mode, the high speed rotation of the optical disk 1 and the aerodynamic effect applied by the stabilizing member 6 realize a highly precise focus servo operation with little focus error (Step S3-8).

Then, once the beam spot B is focused on the recording surface of the optical disk 1, a tracking operation is conducted (Step S3-9). Then, when the position of the optical beam L is stably maintained along a desired track on the surface of the optical disk 1 by the tracking operation, data are recorded to the optical disk 1 or data recorded in the optical disk 1 are reproduced (Step S3-10).

With the optical disk apparatus according to the third embodiment of the present invention, in a case of performing focus control on a thin flexible optical disk 1 by using the stabilizing member 6 for effectively reducing axial runout during high speed rotation of the optical disk 1, the pull-in operation of the focus servo can be reliably executed. Thereby, high speed recording/reproduction of data can be performed with the optical disk apparatus 200.

The present invention is not limited to the specifically disclosed embodiments, and variations and modifications may be made without departing from the scope of the present invention.

The present application is based on Japanese Priority Application Nos. 2007-133991 and 2008-090585 filed on May 21, 2007 and Mar. 31, 2008 with the Japanese Patent Office, the entire contents of which are hereby incorporated herein by reference.

What is claimed is:

1. A data recording/reproduction method for performing a data recording/reproduction process on a flexible optical disk by rotating the flexible optical disk while controlling an axial runout of the flexible optical disk with a stabilizing member that applies an aerodynamic force to the flexible optical disk, and irradiating an optical beam and focusing the optical beam to the flexible optical disk, the method comprising the steps of:
   a) generating a first axial runout by rotating the flexible optical disk at a first rotational speed;
   b) generating a focus error signal forming an S-curve when the first axial runout is generated;
   c) determining a position of the optical beam according to the focus error signal;
   d) generating a second axial runout that is smaller than the first axial runout after step c), the second axial runout generated by rotating the flexible optical disk at a second rotational speed, wherein the first rotational speed is lower than the second rotational speed; and
   e) conducting at least one of the data recording process and the data reproduction process after step d), wherein
   the generating the second axial runout is performed between performing a first focus servo process and performing a second focus servo process.

2. The data recording/reproduction method as claimed in claim 1, wherein the first axial runout is generated by forming a first gap between the stabilizing member and the flexible optical disk, wherein the second axial runout is generated by forming a second gap between the stabilizing member and the flexible optical disk, wherein the first gap is greater than the second gap.

3. The data recording/reproduction method as claimed in claim 1, wherein the first axial runout is generated by forming a first gap between the stabilizing member and the flexible optical disk and rotating the flexible optical disk at a first rotational speed, wherein the second axial runout is generated by forming a second gap between the stabilizing member and the flexible optical disk and rotating the flexible optical disk at a second rotational speed, wherein the first gap is greater than the second gap, wherein the first rotational speed is lower than the second rotational speed.

4. A data recording/reproduction apparatus for performing a data recording/reproduction process on a flexible optical disk by rotating the flexible optical disk while controlling an axial runout of the flexible optical disk with a stabilizing member that applies an aerodynamic force to the flexible optical disk, and irradiating an optical beam and focusing the optical beam to the flexible optical disk, the apparatus comprising:
   a first operation control mode determining part configured to generate a first axial runout by rotating the flexible optical disk at a first rotational speed;
   an optical pickup configured to generate a focus error signal forming an S-curve when the first axial runout is generated;
   a pull-in part configured to determine a position of the optical beam according to the focus error signal;
   a second operation control mode determining part configured to generate a second axial runout that is smaller than the first axial runout, the second axial runout generated by rotating the flexible optical disk at a second rotational speed, wherein the first rotational speed is lower than the second rotational speed; and
   a recording/reproducing part configured to conduct at least one of the data recording process and the data reproduction process, wherein
   the second operation control mode determining part is configured to generate the second axial runout between performing a first focus servo process and performing a second focus servo process.

5. The data recording/reproduction apparatus as claimed in claim 4, wherein the first axial runout is generated by forming a first gap between the stabilizing member and the flexible optical disk, wherein the second axial runout is generated by forming a second gap between the stabilizing member and the flexible optical disk, wherein the first gap is greater than the second gap.

6. The data recording/reproduction apparatus as claimed in claim 4, wherein the first axial runout is generated by forming a first gap between the stabilizing member and the flexible optical disk and rotating the flexible optical disk at a first rotational speed, wherein the second axial runout is generated by forming a second gap between the stabilizing member and the flexible optical disk and rotating the flexible optical disk at a second rotational speed, wherein the first gap is greater than the second gap, wherein the first rotational speed is lower than the second rotational speed.

* * * * *